(12) United States Patent
Uetake et al.

(10) Patent No.: US 10,449,782 B2
(45) Date of Patent: Oct. 22, 2019

(54) RECORDING METHOD AND RECORDING DEVICE

(71) Applicants: Kazuyuki Uetake, Shizuoka (JP); Yoshihiko Hotta, Shizuoka (JP); Ichiro Sawamura, Shizuoka (JP); Tomomi Ishimi, Shizuoka (JP); Yasuroh Yokota, Shizuoka (JP)

(72) Inventors: Kazuyuki Uetake, Shizuoka (JP); Yoshihiko Hotta, Shizuoka (JP); Ichiro Sawamura, Shizuoka (JP); Tomomi Ishimi, Shizuoka (JP); Yasuroh Yokota, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/050,098

(22) Filed: Jul. 31, 2018

(65) Prior Publication Data

US 2018/0333966 A1    Nov. 22, 2018

Related U.S. Application Data

(63) Continuation of application No. PCT/JP2017/003253, filed on Jan. 30, 2017.

(30) Foreign Application Priority Data

Feb. 5, 2016    (JP) .................................. 2016-021286
Jan. 27, 2017   (JP) .................................. 2017-013641

(51) Int. Cl.
    *B41J 2/455*    (2006.01)
    *B41M 5/46*     (2006.01)
    (Continued)

(52) U.S. Cl.
    CPC .................. *B41J 2/455* (2013.01); *B41J 2/46* (2013.01); *B41J 2/475* (2013.01); *B41J 2/4753* (2013.01);
    (Continued)

(58) Field of Classification Search
    CPC ... B41J 2/46; B41J 2/4753; B41J 2/455; B41J 2/447; B41J 2/45; B41J 2/473;
    (Continued)

(56) References Cited

U.S. PATENT DOCUMENTS

| 4,460,909 A | * | 7/1984 | Bassetti | ............... G06K 15/128 |
| | | | | 347/129 |
| 4,991,930 A | * | 2/1991 | Baek | ....................... G02B 6/06 |
| | | | | 385/115 |

(Continued)

FOREIGN PATENT DOCUMENTS

| CN | 101032879 A | 9/2007 |
| CN | 102421603 A | 4/2012 |

(Continued)

OTHER PUBLICATIONS

International Search Report dated Mar. 21, 2017 for counterpart International Patent Application No. PCT/JP2017/003253 filed Jan. 30, 2017.

(Continued)

*Primary Examiner* — John Zimmermann
(74) *Attorney, Agent, or Firm* — Oblon, McClelland, Maier & Neustadt, L.L.P.

(57) ABSTRACT

Recording method including emitting laser light from optical fiber array to record image formed of writing units with moving recording target and the optical fiber array relatively using recording device including laser light-emitting elements and emitting unit including the optical fiber array where optical fibers for guiding laser light from the laser light-emitting elements are aligned wherein (A'D/A'C) that is ratio of length of diagonal line A'D to length of diagonal line A'C in the image formed in a manner that at least part of the writing units are overlapped one another in the main-scanning direction is 1.05 or greater.

12 Claims, 14 Drawing Sheets

(51) Int. Cl.
  *B41J 2/46* (2006.01)
  *B41J 2/475* (2006.01)
  *G02B 6/38* (2006.01)
  *G02B 6/36* (2006.01)

(52) U.S. Cl.
  CPC .............. *B41M 5/46* (2013.01); *G02B 6/3672* (2013.01); *G02B 6/3676* (2013.01); *G02B 6/3839* (2013.01)

(58) Field of Classification Search
  CPC ...... B41J 2/442; G02B 6/3839; G02B 6/3672; G02B 6/3676; G06K 15/1228; G06K 15/029
  See application file for complete search history.

(56) References Cited

U.S. PATENT DOCUMENTS

| | | | |
|---|---|---|---|
| 5,109,460 A | 4/1992 | Baek et al. | |
| 6,325,474 B1 | 12/2001 | Betzold et al. | |
| 6,836,278 B2* | 12/2004 | Saito | G02B 26/123 |
| | | | 347/233 |
| 8,581,948 B2* | 11/2013 | Hasegawa | B41J 2/4753 |
| | | | 347/171 |
| 2002/0015088 A1* | 2/2002 | Inoue | B41J 2/45 |
| | | | 347/238 |
| 2002/0186268 A1* | 12/2002 | Endo | B41J 2/16508 |
| | | | 347/19 |
| 2009/0203521 A1 | 8/2009 | Ishimi et al. | |
| 2011/0090299 A1 | 4/2011 | Asai et al. | |
| 2012/0075402 A1 | 3/2012 | Ishimi et al. | |
| 2017/0082805 A1* | 3/2017 | Saikawa | G02B 6/42 |

FOREIGN PATENT DOCUMENTS

| | | |
|---|---|---|
| JP | 05-281423 | 10/1993 |
| JP | 07-171985 | 7/1995 |
| JP | 2001-520954 | 11/2001 |
| JP | 2006-305853 | 11/2006 |
| JP | 2009-214538 | 9/2009 |
| JP | 2010-052350 | 3/2010 |
| JP | 2011-031462 | 2/2011 |
| JP | 2011-104994 | 6/2011 |

OTHER PUBLICATIONS

Written Opinion dated Mar. 21, 2017 for counterpart International Patent Application No. PCT/JP2017/003253 filed Jan. 30, 2017.
Chinese Office Action dated Apr. 28, 2019 in Chinese Patent Application No. 2017800097723 with English Translation.

* cited by examiner

RECORDING METHOD AND RECORDING DEVICE

CROSS-REFERENCE TO RELATED APPLICATIONS

The present application is a continuation application of International Application No. PCT/JP2017/003253, filed Jan. 30, 2017, which claims priority to Japanese Patent Application No. 2016-021268, filed Feb. 5, 2016 and Japanese Patent Application No. 2017-013641, filed Jan. 27, 2017. The contents of these applications are incorporated herein by reference in their entirety.

BACKGROUND OF THE INVENTION

Field of the Invention

The present disclosure relates to a recording method and a recording device.

Description of the Related Art

As a recording method for performing recording on thermosensitive recording media with a change in hue or reflectance caused by heating, for example, contact recording methods, such as use of heat stamps or thermal heads, have been generally known. Among the above-mentioned examples, thermal heads have been most commonly used.

In a recording method using the thermal head, the thermal head is pressed against a thermosensitive recording medium in order to achieve sufficient heat conductivity. Therefore, print missing occurs due to deterioration of a surface of the thermal head caused by dirt or foreign matter deposited on a surface of the thermosensitive recording medium. As a result, maintenance or replacement of the thermal head may be required.

Meanwhile, as methods for recording in non-contact manner, there are recording methods using laser. As the recording methods using laser, typical is a method where one laser beam is scanned by a galvanometer mirror to perform recording. The above-described recording method however has a problem that a recording time is prolonged, as a quantity of information of a recording image increases. In order to solve the problem, for example, proposed is an image-replacement method where a reversible thermosensitive recording medium is exposed to a laser beam set to satisfy the desired relationship using a laser array exposure unit, in which a plurality of lasers each independently driven are aligned in a direction orthogonal to a moving direction of the reversible thermosensitive recording medium (see, for example, Japanese Unexamined Patent Application Publication No. 2010-52350).

SUMMARY OF THE INVENTION

According to one aspect of the present disclosure, a recording method includes emitting laser light from an optical fiber array to record an image with moving a recording target and the optical fiber array relatively using a recording device. The image is formed of writing units. The recording device includes a plurality of laser light-emitting elements and an emitting unit that includes the optical fiber array, in which a plurality of optical fibers configured to guide laser light emitted from the laser light-emitting elements are aligned. (A'D/A'C) that is a ratio of a length of a diagonal line A'D to a length of a diagonal line A'C in the image formed in a manner that at least part of the writing units are overlapped one another in a main-scanning direction is 1.05 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

Figure 1:
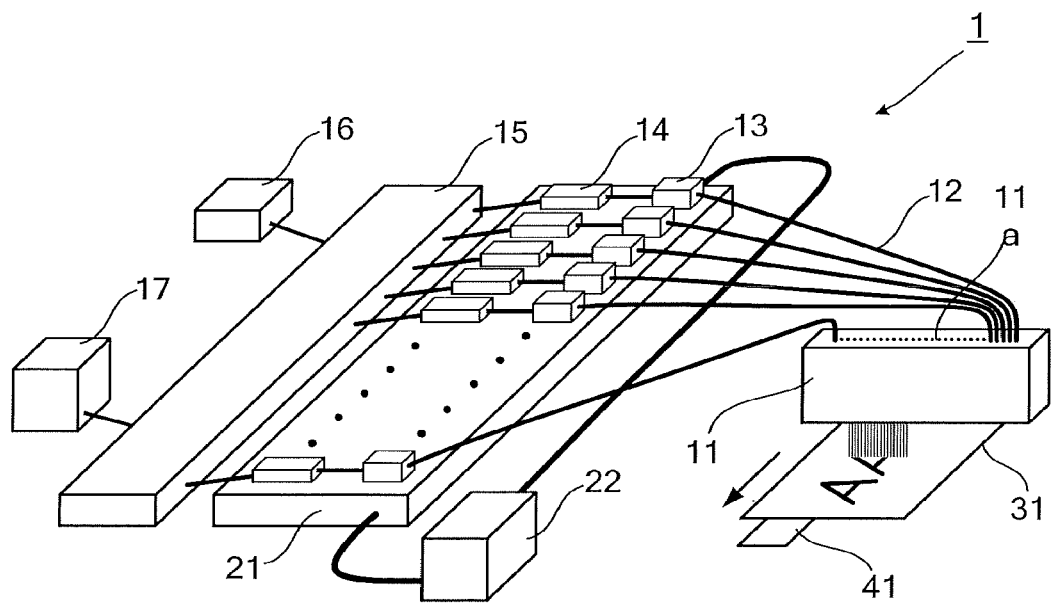
FIG. 1 is a schematic view illustrating one example of a recording device of the present disclosure including an optical fiber array.

DESCRIPTION OF THE EMBODIMENTS (Recording Method and Recording Device)

A recording method of the present disclosure includes emitting laser light from an optical fiber array to record an image with moving a recording target and the optical fiber array relatively using a recording device. The image is formed of writing units. The recording device includes a plurality of laser light-emitting elements and an emitting unit that includes the optical fiber array, in which a plurality of optical fibers configured to guide laser light emitted from the laser light-emitting elements are aligned. (A'D/A'C) that is a ratio of a length of a diagonal line A'D to a length of a diagonal line A'C in the image formed in a manner that at least part of the writing units are overlapped one another in a main-scanning direction is 1.05 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

A recording device of the present disclosure includes a plurality of laser light-emitting elements and an emitting unit including an optical fiber array, in which a plurality of optical fibers configured to guide laser light emitted from the laser light-emitting elements are aligned. The recording device is configured to apply laser light emitted from the optical fiber array with moving a recording target and the optical fiber array relatively, to record an image formed of writing units. (A'D/A'C) that is a ratio of a length of a diagonal line A'D to a length of a diagonal line A'C in the image formed in a manner that at least part of the writing units are overlapped one another in a main-scanning direction is 1.05 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

The present disclosure has an object to provide a recording method that can record a high quality image having less density unevenness of a solid image and less burns.

The present disclosure can provide a recording method that can record a high quality image having less density unevenness of a solid image and less burns.

The recording method and recording device of the present disclosure have been accomplished based on the following insights. According to the recording method using a laser array exposure unit disclosed in Japanese Unexamined Patent Application Publication No. 2010-52350 in the art, gaps between dots are not completely filled because the dots formed have circular shapes to cause white missing spots between the clots. The gaps between the clots can be filled by applying an excessive amount of energy to fill the gaps between the dots. However, electricity consumption becomes high, hence economically disadvantageous.

When an image is written with circles or simple ovals, a large area of the image needs to be overlapped to write in order to fill gaps in the solid image. As a result, energy applied to the overlapped area becomes large to burn the image (image density lowers and as a result unevenness of image density occurs). It has been found that, on the other hand, a solid image having uniform image density can be written by overlapping images deformed diagonally with a smaller area of overlaps of the images compared to circles.

In the present specification, the image formed in a manner that at least part of the writing units are overlapped one another in the main-scanning direction means all images having overlaps in the main-scanning direction where the images are written by light emitted from at least 2 optical fibers that are next to each other in the main-scanning direction and constitute an optical fiber array.

Moreover, a line width can be determined from a result of a density distribution measurement of a writing unit. Typically, around a center of the writing unit has high recording density, and a peripheral area of the writing unit has low recording density.

Moreover, the line width of the writing unit along the main-scanning direction is determined by measuring a density profile of the writing unit along the main-scanning direction, determining a line of an area at which the density is 50% density of a density difference between the maximum recording density and an unrecorded area, as an outline, measuring 5 points at which a width of the outline is constant, and taking an average value of the measured value as a line width.

In the present specification, the maximum recording density means optical density of an area at which an optical change occurred by laser recording is the largest, and includes both a case where optical density increases as a result of the laser recording compared to an unrecorded area and a case where optical density decreases as a result of the laser recording compared to an unrecorded area.

Figure 12:
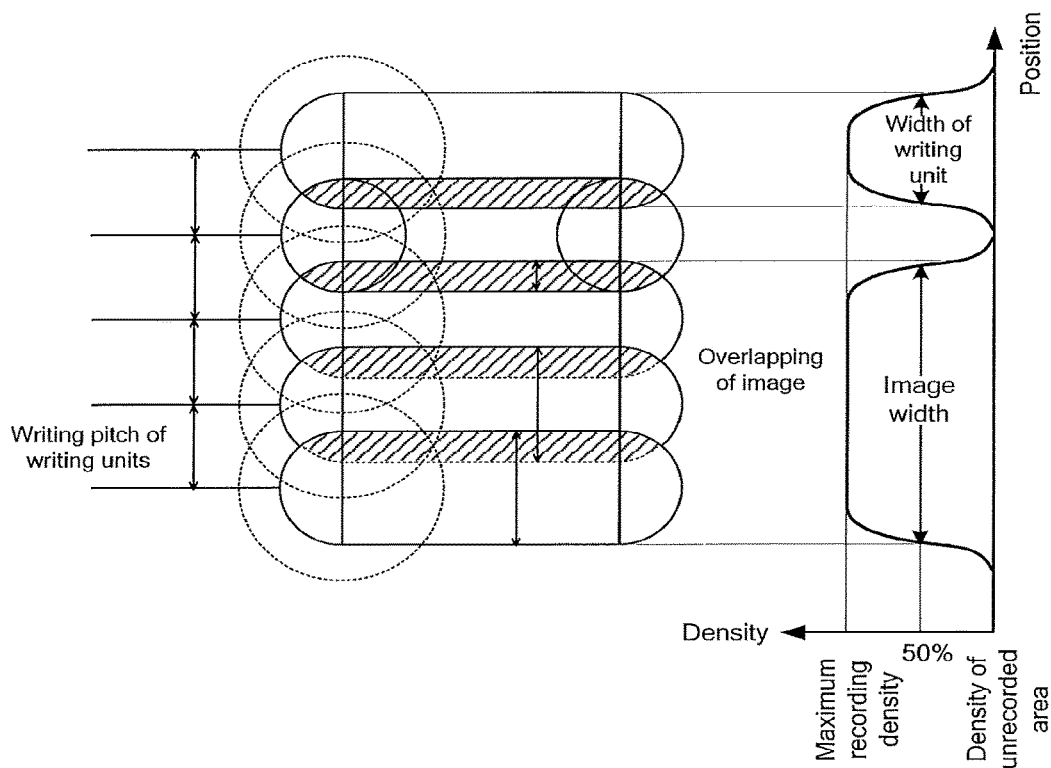
FIG. 12 is a schematic view depicting a definition of a line width and a definition of an image.

As a device for measuring a density profile of a writing unit along the main-scanning unit, a microdensitometer (PDM-7, available from available from KONICA MINOLTA, INC.) can be used. Note that, FIG. 12 is a schematic view depicting a definition of a line width and a definition of an image.

There are two scanning directions of the laser, a main-scanning direction and a sub-scanning direction. The main-scanning direction and the sub-scanning direction are orthogonal to each other.

The main-scanning direction is a direction along which a plurality of the optical fibers each independently driven are aligned.

The sub-scanning direction is a direction along which the recording target is moved.

Since an image is recorded on the recording target by moving the optical fiber array and the recording target relatively, the optical fiber array may travel relative to the recording target, or the recording target may travel relative to the optical fiber array.

In the present disclosure, (A'D/A'C) that is the ratio of the length of the diagonal line A'D to the length of the diagonal line A'C in the image formed in a manner that at least part of the writing units are overlapped one another in the main-scanning direction is 1.05 or greater, preferably 1.10 or greater, and more preferably 1.20 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

When (A'D/A'C)×100 that is the ratio of the length of the diagonal line A'D to the length of the diagonal line A'C is 1.05 or greater, a high quality image having less density unevenness of a solid image and less burns can be recorded.

In the present disclosure, a method for recording an image on a recording target using the recording device including an optical fiber array, in which a plurality of optical fibers each independently driven are aligned in a main-scanning direction orthogonal to a sub-scanning direction that is a moving direction of the recording target, is not particularly limited and may be appropriately selected depending on the intended purpose. Examples of the method include: a method where light distribution of a certain direction (e.g., a sub-scanning direction) is narrowed by modifying a shape of a lens; a method using a beam splitter; and a method using optical fibers each core shape of which is other than circle (e.g., a polygonal-core optical fiber (Top Hat Fiber (registered trademark) available from Mitsubishi Cable Industries, Ltd.).

<Image>

The image is not particularly limited and may be appropriately selected depending on the intended purpose, as long as the image is visually recognizable information. Examples of the image include letters, symbols, lines, figures, solid images, combinations of any of the foregoing images, QR codes (registered trademark), barcodes, and two-dimensional codes.

<Recording Target>

The recording target is not particularly limited and may be appropriately selected depending on the intended purpose, as long as the recording target is an object that absorbs light and converts the light into heat to form an image. Examples of the recording target include thermosensitive recording media, structures each including a thermosensitive recording area, and laser marking, such as engraving to metal. Among the above-listed examples, a thermosensitive recording medium and a structure including a thermosensitive recording area are preferable.

Examples of the thermosensitive recording area include an area of a surface of a structure, to which a thermosensitive recording label is bonded, and an area of a surface of a structure, which is coated with a thermosensitive recording material.

The structure including a thermosensitive recording area is not particularly limited and may be appropriately selected depending on the intended purpose, as long as the structure including a thermosensitive recording area includes the thermosensitive recording area on a surface of the structure. Examples of the structure include: various products, such as plastic bags, PET bottles, and tins; transportation containers, such as cardboard boxes and shipping containers; products in process; and industrial products.

Thermosensitive Recording Medium

As the thermosensitive recording medium, a thermosensitive recording medium, to which image recording is performed once, is suitably used. Note that, a thermoreversible recording medium, to which image recording and image erasing can be repetitively performed, can be also used as the thermosensitive recording medium.

The thermosensitive recording medium includes a support and a thermosensitive coloring layer on the support, and may further include other layers according to the necessity. Each of the above-mentioned layers may have a single-layer structure or a laminate structure, and may be disposed on the other surface of the support.

Thermosensitive Coloring Layer

The thermosensitive coloring layer includes a material that absorbs laser light and converts the laser light into heat (photothermal conversion material) and a material that causes a change in hue or reflectance with heat, and may further include other ingredients according to the necessity.

The material that causes a change in hue or reflectance with heat is not particularly limited and may be appropriately selected depending on the intended purpose. For example, materials known in the art, such as a combination of an electron-donating dye precursor and an electron-accepting color developer used in thermosensitive paper in the art can be used. Moreover, the change of the material includes a complex reaction of heat and light, such as a discoloring reaction due to solid-phase polymerization of a diacetylene-based compound caused by heating and UV irradiation.

The electron-donating dye precursor is not particularly limited and may be appropriately selected from materials typically used for thermosensitive recording materials. Examples of the electron-donating dye precursor include leuco compounds of dyes, such as triphenyl methane-based dyes, fluoran-based dyes, phenothiazine-based dyes, auramine-based dyes, spiropyran-based dyes, and indophthalide-based dyes.

As the electron-accepting color developer, various electron-accepting compounds or oxidizers that can color the electron-donating dye precursor as contacted, can be used.

The photothermal conversion material can be roughly classified into inorganic materials and organic materials.

Examples of the inorganic materials include particles of at least one of carbon black, metal boride, and metal oxide of Ge, Bi, In, Te, Se, or Cr. Among the above-listed examples, a material that absorbs a large amount of light of a near infrared wavelength region and a small amount of light of a visible range wavelength region is preferable, and the metal boride and the metal oxide are more preferable. As the metal boride and the metal oxide, for example, at least one selected from the group consisting of hexaboride, a tungsten oxide compound, antimony tin oxide (ATO), indium tin oxide (ITO), and zinc antimonate is preferable.

Examples of the hexaboride include $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, $CaB_6$, and $(La, Ce)B_6$.

Examples of the tungsten oxide compound include particles of tungsten oxide represented by the general formula: $WyOz$ (where W is tungsten, O is oxygen, and $2.2 \leq z/y \leq 2.999$), and particles of tungsten complex oxide represented by the general formula: MxWyOz (where M is at least one element selected from the group consisting of H, He, alkali metal, alkaline earth metal, rare-earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and $0.001 \le x/y \le 1$, $2.2 \le z/y \le 3.0$) as disclosed in WO2005/037932, and Japanese Unexamined Patent Application Publication No. 2005-187323. Among the above-listed examples, cesium-containing tungsten oxide is particularly preferable because absorption of light in the near infrared region is large and absorption of light in the visible region is small.

Among antimony tin oxide (ATO), indium tin oxide (ITO), and zinc antimonate, moreover, ITO is particularly preferable because absorption of light in the near infrared region is large and absorption of light in the visible region is small.

The above-listed materials may be formed into a layer by vacuum deposition or bonding a particular material with a resin.

As the organic materials, various dyes may be appropriately used depending on a wavelength of light to be absorbed. In the case where a semiconductor laser is used as a light source, a near infrared absorbing dye having an absorption peak at from about 600 nm through about 1,200 nm is used. Specific examples of such a dye include cyanine dyes, quinone-based dyes, quinoline derivatives of in donaphthol, phenylene diamine-based nickel complexes, and phthalocyanine-based dyes.

The photothermal conversion material may be used alone or in combination.

The photothermal conversion material may be included in a thermosensitive coloring layer, or in a layer other than the thermosensitive coloring layer. In the case where the photothermal conversion material is included in a layer other than the thermosensitive coloring layer, a photothermal conversion layer is preferably disposed adjacent to the thermosensitive coloring layer. The photothermal conversion layer includes at least the photothermal conversion material and a binder resin.

Examples of the above-mentioned other ingredients include binder resins, thermoplastic materials, antioxidants, photostabilizers, surfactants, lubricants, and filler.

Support

A shape, structure, or size of the support is not particularly limited and may be appropriately selected depending on the intended purpose. Examples of the shape include a plate shape. The structure may be a single-layer structure or a laminate structure. The size can be appropriately selected depending on a size of the thermosensitive recording medium.

Other Layers

Examples of the above-mentioned other layers include a photothermal conversion layer, a protective layer, an under layer, a UV ray-absorbing layer, an oxygen-barrier layer, an intermediate layer, a backing layer, an adhesive layer, and a pressure-sensitive adhesive layer.

The thermosensitive recording medium can be processed into a desired shape depending on the intended use. Examples of the shape include a card shape, a tag shape, a label shape, a sheet shape, and a roll shape.

Examples of the thermosensitive recording medium processed into the card shape include pre-payed cards, point cards, and credit cards. The thermosensitive recording medium in the shape of the tag smaller than the card size can be used as a price tag. Moreover, the thermosensitive recording medium in the shape of the tag larger than the card size can be used for process control, shipping instructions, and thickets. Since the thermosensitive recording medium in the shape of the label can be bonded, such a thermosensitive recording medium can be processed into various sizes, and can be used for process control or goods management by bonding the thermosensitive recording medium to a dolly, container, box, or shipping container, which is repetitively used. Moreover, the thermosensitive recording medium having a sheet size lager than the card size has a large area where an image can be recorded, and therefore such a thermosensitive recording medium can be used for general documents, or instructions for process control.

The recording device of the present disclosure includes an optical fiber array, preferably includes an emitting unit, and may further include other units according to the necessity.

<Optical Fiber Array>

In the optical fiber array, a plurality of optical fibers are aligned along a main-scanning direction orthogonal to a sub-scanning direction that is a moving direction of a recording target. The emitting unit is configured to apply emitted laser light to the recording target via the optical fiber array to recode an image formed of writing units.

An alignment of the optical fibers is not particularly limited and may be appropriately selected depending on the intended purpose. Examples of the alignment include a linear alignment, and a planar alignment. Among the above-listed examples, the linear alignment is preferable.

A minimum distance (pitch) between centers of the optical fibers is preferably 1.0 mm or less, more preferably 0.5 mm or less, and even more preferably 0.03 mm or greater but 0.15 mm or less.

When the minimum distance (pitch) between centers of the optical fibers is 1.0 mm or less, high-resolution recording is enabled, and a high-definition image compared to images generally formed in the art can be realized.

The number of the optical fibers aligned in the optical fiber array is preferably 10 or greater, more preferably 50 or greater, and even more preferably 100 or greater but 400 or less.

When the number of the optical fibers aligned is 10 or greater, high-speed recording is enabled, and a high-definition image compared to images generally formed in the art can be realized.

An optical system, such as an optical system composed of lenses, can be disposed to follow the optical fiber array in order to control a spot diameter of the laser light.

A structure, in which a plurality of the optical fiber arrays are disposed in lines along the main-scanning direction, may be employed depending on a size of the recording target in the main-scanning direction.

Optical Fiber

The optical fiber is an optical waveguide of laser light emitted from the emitting unit.

Examples of the optical fiber include optical fibers.

A shape, size (diameter), material, or structure of the optical fiber is not particularly limited and may be appropriately selected depending on the intended purpose.

A size (diameter) of the optical fiber is preferably 15 μm or greater but 1,000 μm or smaller, and more preferably 20 μm or greater but 800 μm or smaller. The optical fiber having a diameter of 15 μm or greater but 1,000 μm or smaller is advantageous in view of high image definition.

A material of the optical fiber is not particularly limited and may be appropriately selected depending on the intended purpose. Examples of the material include quartz, glass, and resins A transmission wavelength range of the material of the optical fiber is not particularly limited and may be appropriately selected depending on the intended purpose. The transmission wavelength range is preferably 700 nm or longer but 2,000 nm or shorter, and more preferably 780 nm or longer but 1,600 nm or shorter. The structure of the optical fiber is preferably a structure including a core that is a center through which laser light is transmitted, and a cladding layer disposed at the periphery of the core.

A diameter of the core is not particularly limited and may be appropriately selected depending on the intended purpose. The diameter is preferably 10 µm or greater but 500 µm or less, and more preferably 15 µm or greater but 400 µm or less.

A material of the core is not particularly limited and may be appropriately selected depending on the intended purpose. Examples of the material include germanium-doped or phosphorus-doped glass.

An average thickness of the cladding layer is not particularly limited and may be appropriately selected depending on the intended purpose. The average thickness is preferably 10 µm or greater but 250 µm or less, and more preferably 15 µm or greater but 200 µm or less.

A material of the cladding layer is not particularly limited and may be appropriately selected depending on the intended purpose. Examples of the material include boron-doped or fluorine-doped glass.

<Emitting Unit>

The emitting unit is a unit configured to apply emitted laser light to the recording target via the optical fiber array.

The emitting unit can control a length of each writing unit along the sub-scanning direction with a cycle and duty ratio of an input pulse signal based on the pulse signal and a spot diameter of the laser light on the recording target, and can record with edges of the writing units adjacent to each other in the sub-scanning direction overlapping in the sub-scanning direction.

The emitting unit is not particularly limited and may be appropriately selected depending on the intended purpose. Examples of the emitting unit include a semiconductor laser, and a solid optical fiber laser. Among the above-listed examples, the recording device is preferably a semiconductor laser because the semiconductor laser has a wide wavelength selectivity, a laser light source itself is small, a size of the device can be made small, and the semiconductor laser can be made low cost.

A wavelength of the laser light is not particularly limited and may be appropriately selected depending on the intended purpose. The wavelength is preferably 700 nm or longer but 2,000 nm or shorter, and more preferably 780 nm or longer but 1,600 nm or shorter.

An output of the laser light is not particularly limited and may be appropriately selected depending on the intended purpose. The output is preferably 1 W or greater, but more preferably 3 W or greater. When the output of the laser light is 1 W or greater, it is advantageous in view of high density of an image.

A shape of a spot writing unit of the laser light is not particularly limited and may be appropriately selected depending on the intended purpose. Examples of the shape include a circle, an oval, and various polygons, such as a triangle, a square, a pentagon, and a hexagon. Among the above-listed examples, a circle and an oval are preferable.

Figure 4:
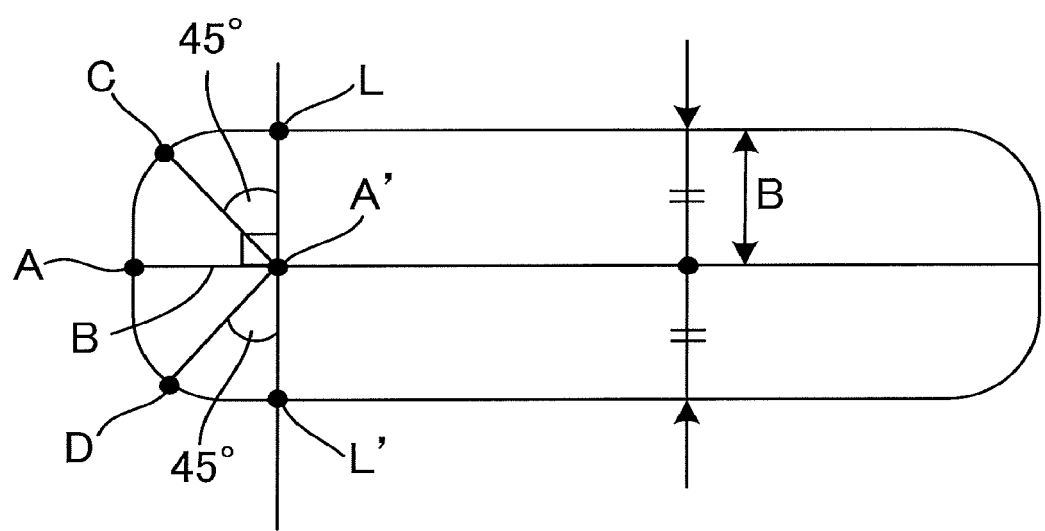
FIG. 4 is a view for explaining a definition of an oval of a writing unit.

A spot writing unit of the laser light being an oval means as follows. When a straight line is drawn on a recording target with a single beam of identical energy as illustrated in FIG. 4, ½ of a line width is determined as B, a center of a left edge of the line is determined as A, points vertically crossing with the drawn straight line with the points moved from the starting point A of the line towards the center direction of the line width by the distance B are determined as L and L', and a cross point between a vertical line from the starting point A of the line and the line LL' is determined as A'. When a distance A'C where C is a boundary of the drawn line that is in the 45° top-left direction from A' is longer than B, the spot writing unit is an oval. Alternatively, when a distance A'D where D is a boundary of the drawn line that is in the 45° left-down direction from A' is longer than B, the spot writing unit is an oval. The distance A'C and the distance A'D are almost identical, and the phrase "almost identical" means that a difference is in the range of ±10% or less.

Incidentally, a line width is an average value of values measured at 5 points at which the line width is constant.

A size (spot diameter) of the laser spot writing unit of the laser light is not particularly limited and may be appropriately selected depending on the intended purpose. The size is preferably 30 µm or greater but 5,000 µm or less.

The spot diameter is not particularly limited and may be appropriately selected depending on the intended purpose. For example, the spot diameter can be measured by means of a beam profiler.

Control of the laser is not particularly limited and may be appropriately selected depending on the intended purpose. The control may be pulse control or continuous control.

<Other Units>

Other units are not particularly limited and may be appropriately selected depending on the intended purpose. Examples of the above-mentioned other units include a driving unit, a controlling unit, a main-controlling unit, a cooling unit, a power-supplying unit, and a conveying unit.

Driving Unit

The driving unit is configured to output the pulse signal, which is generated based on a driving signal input from the controlling unit, to the emitting unit to drive the emitting unit.

The driving units are respectively disposed to a plurality of the emitting units, and are configured to independently drive the emitting units.

Controlling Unit

The controlling unit is configured to output a driving signal, which is generated based on image information transmitted from the main-controlling unit, to the driving unit to control the driving unit.

Main-Controlling Unit

The main-controlling unit includes a central processing unit (CPU) configured to control each operation of the recording device, and is configured to execute various processes based on a control program for controlling operation of the entire recording device of the present disclosure.

Examples of the main-controlling unit include a computer.

The main-controlling unit is coupled with the controlling unit in a manner that the main-controlling unit and the controlling unit can communicate, and the main-controlling unit transmits image information to the controlling unit.

Cooling Unit

The cooling unit is disposed near the driving unit and the controlling unit to cool the driving unit and the controlling unit. When a duty ratio of a pulse signal is high, time of laser oscillation is long, and therefore it becomes difficult to cool the driving unit and the controlling unit with the cooling unit. As a result, irradiation energy of laser light varies, and an image may not be able to be recorded stably.

Power-Supplying Unit

The power-supplying unit is configured to supply power to the controlling unit.

Conveying Unit

The conveying unit is not particularly limited and may be appropriately selected depending on the intended purpose, as long as the conveying unit is capable of conveying the recording target in a sub-scanning direction. Examples of the conveying unit include a linear slider.

Conveying speed of the recording target by the conveying unit is not particularly limited and may be appropriately selected depending on the intended purpose. The conveying speed is preferably 10 mm/s or greater but 10,000 mm/s or less, and more preferably 100 mm/s or greater but 8,000 mm/s or less.

One example of the recording device of the present disclosure for use in the recording method of the present disclosure is described with reference to drawings.

Note that, identical reference numerals are provided to identical structural members in drawings, and duplicated descriptions may be omitted. Moreover, the number, positions, and shapes of the structural members below are not limited to the embodiment of the present disclosure, and the number, positions, and shapes suitable for carrying out the present disclosure can be selected.

FIG. 1 is a schematic view illustrating one example of the recording device of the present disclosure including an optical fiber array.

As illustrated in FIG. 1, the recording device 1 records an image formed of writing units using an optical fiber array 11, in which a plurality of optical fibers 12 are aligned in a main-scanning direction orthogonal to a sub-scanning direction that is a moving direction of a recording target 31 and is presented with an arrow in FIG. 1, and a plurality of emitting units 13 respectively coupled to the optical fibers 12 of the optical fiber array 11 in a manner that the emitting units can emit laser light to the optical fibers 12, by applying laser light from the optical fiber array 11 to a recording target 31 with conveying the recording target 31 in the sub-scanning direction.

The optical fiber array 11 is such that one array head 11a or a plurality of the array heads 11a are linearly aligned along the main-scanning direction, and includes an optical system, which is capable of controlling a spot diameter of laser light and is not illustrated in FIG. 1, on a light path of laser light emitted from the array head 11a.

The recording device 1 controls a length of the writing unit in the sub-scanning direction with a spot diameter of laser light to the recording target 31, and a cycle and duty ratio of a pulse signal input to the emitting unit 13 by the driving unit 14, to record with overlapping, in the sub-scanning direction, edges of the writing units adjacent to each other in the sub-scanning direction.

The emitting unit 13 is a semiconductor laser. A wavelength of laser light emitted from the emitting unit is 915 nm, and output of laser light of the emitting unit is 30 W.

The driving unit 14 is configured to output a pulse signal, which is generated based on a driving signal input from the controlling unit 15, to the emitting unit 13 to drive the emitting unit 13.

The driving units 14 are respectively disposed to a plurality of the emitting units 13, and are configured to independently drive the emitting units 13.

The controlling unit 15 is configured to output a driving signal, which is generated based on image information transmitted from the main-controlling unit 16, to the driving unit 14 to control the driving unit 14.

The main-controlling unit 16 includes a central processing unit (CPU) configured to control each operation of the recording device 1, and is configured to execute various processes based on a control program for controlling operation of the entire recording device 1.

The main-controlling unit 16 is coupled to the controlling unit 15 in a manner that the main-controlling unit and the controlling unit can be communicate, and is configured to transmit image information to the controlling unit 15.

The power-supplying unit 17 is configured to supply power to the controlling unit 15.

The cooling unit 21 is disposed below the driving unit and the controlling unit, and is configured to cool the driving unit and the controlling unit using a liquid of a constant temperature circulated by a chiller 22.

Typically, only cooling is performed in a chiller system without performing heating. Therefore, a temperature of a light source never be higher than a set temperature of the chiller, but the temperature of the cooling unit and the temperature of the laser light source to be in contact with may vary depending on an environmental temperature. In the case where a semiconductor laser is used as a laser light source, meanwhile, output of laser varies depending on a temperature of the laser light source (the output of laser is high when the temperature of the laser light source is low). In order to control output of laser, a regular image formation is preferably formed by measuring a temperature of a laser light source or a temperature of a cooling unit, an input signal to a driving circuit configured to control output of the laser is controlled to make the laser output constant depending on the result of the measurement.

The conveying unit 41 is configured to convey the recording target 31 in the sub-scanning direction.

Figure 2:
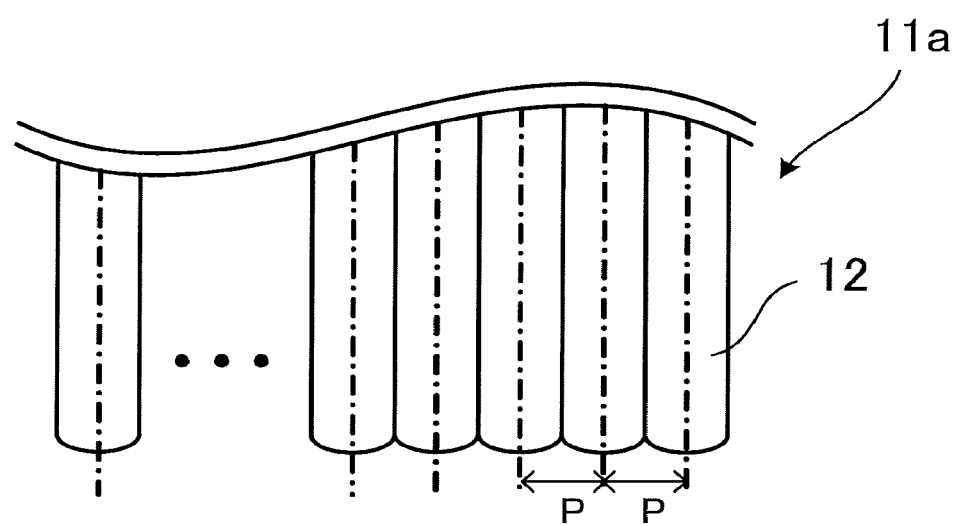
FIG. 2 is a partially-omitted enlarged view of the optical fiber array of FIG. 1.

FIG. 2 is a partially-omitted enlarged view of the array head 11a of FIG. 1.

The array head 11a includes a plurality of the optical fibers 12 that are linearly aligned along the main-scanning direction, and the pitch P of the optical fibers 12 is constant.

Figure 3:
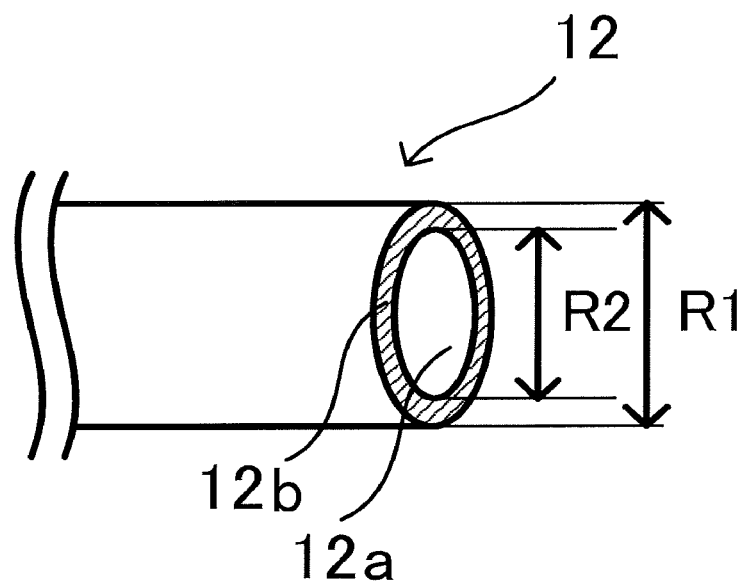
FIG. 3 is an enlarged partial view of the optical fiber of FIG. 2.

FIG. 3 is an enlarged partial view of the optical fiber of FIG. 2.

As illustrated in FIG. 3, the optical fiber 12 includes a core 12a that is a center through which laser light is transmitted, and a cladding layer 12b disposed at the periphery of the core 12a, and has a structure where a refractive index of the core 12a is higher than a refractive index of the cladding layer 12b so that laser light is transmitted only through the core 12a with total reflection or refraction.

A diameter R1 of the optical fiber 12 is 125 μm, and a diameter R2 of the core 12a is 105 μm.

FIGS. 5A to 5D are views illustrating examples of an arrangement of array heads. In FIGS. 5A to 5D, X represents a sub-scanning direction and Z represents a main-scanning direction.

Figure 5A:
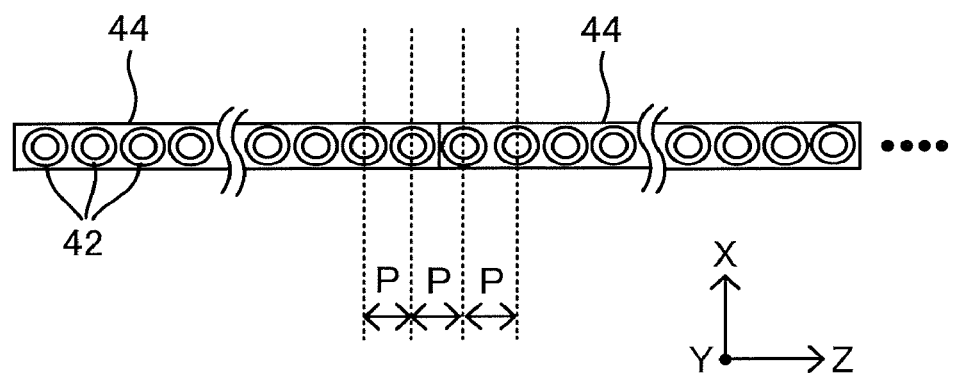
FIG. 5A is a view illustrating one example of an alignment state of array heads.
Figure 5B:
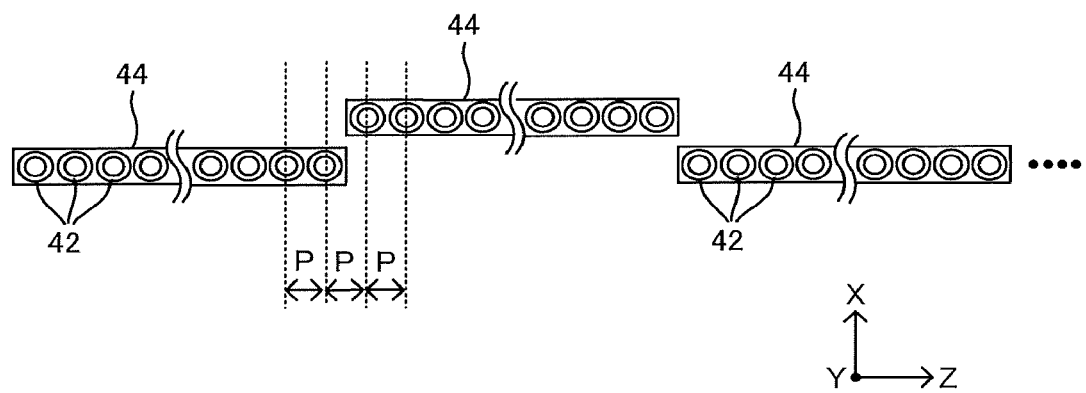
FIG. 5B is a view illustrating another example of an alignment state of array heads.

The optical fiber array 11 may be composed of one array head. In case of a long optical fiber array head, however, the array head itself is long and tends to be deformed. Therefore, it is difficult to maintain a straight line of arraignments of beams, or uniformity of pitches of the beams. Accordingly, a plurality of the array heads 44 may be arranged in arrays along a main-scanning direction (Z-axis direction), as illustrated in FIG. 5A, or may be arranged in a grid, as illustrated in FIG. 5B. In the example of the recording device including the optical fiber array according to the present disclosure illustrated in FIG. 1, one array head aligned along the main-scanning direction is mounted.

The grid arrangement of the array heads 44 as illustrated in FIG. 5B is more preferable than the linear arrangement in the main-scanning direction (Z-axis direction) as illustrated in FIG. 5A in view of easiness of assembly.

Figure 5C:
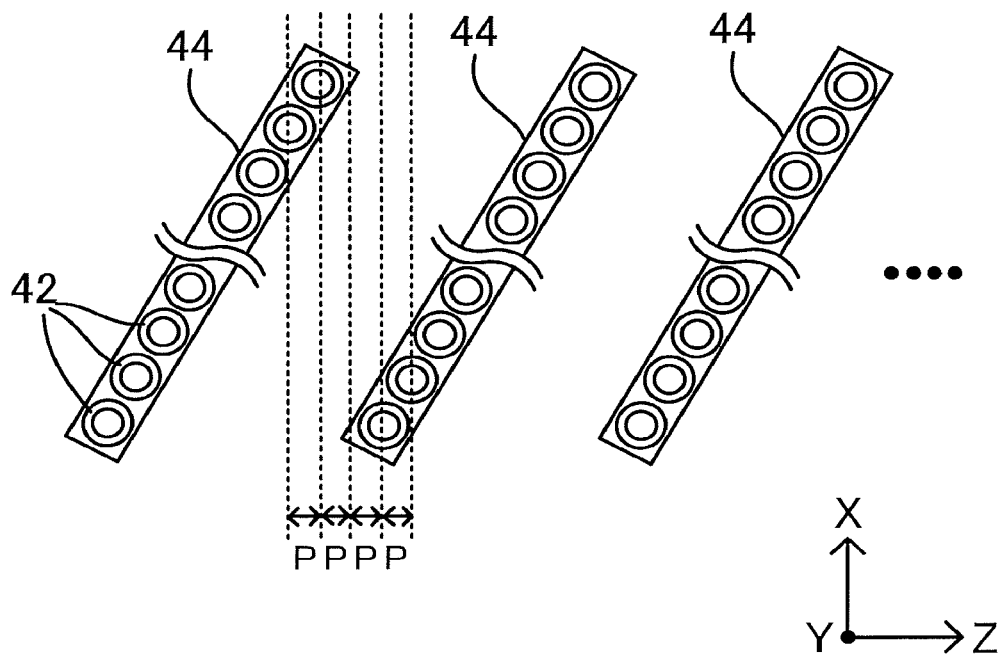
FIG. 5C is a view illustrating another example of an alignment state of array heads.

Moreover, the array heads 44 may be arranged with inclination along a sub-scanning direction. The array heads 44 may be arranged with inclination along the sub-scanning direction (X-axis direction), as illustrated in FIG. 5C. When the array heads 44 are arranged with inclination along the sub-scanning direction (X-axis direction), a pitch P of the optical fibers 42 in the main-scanning direction (Z-axis direction) can be narrowed compared to the arrangements illustrated in FIGS. 5A and 5B, to thereby achieve high resolution.

Figure 5D:
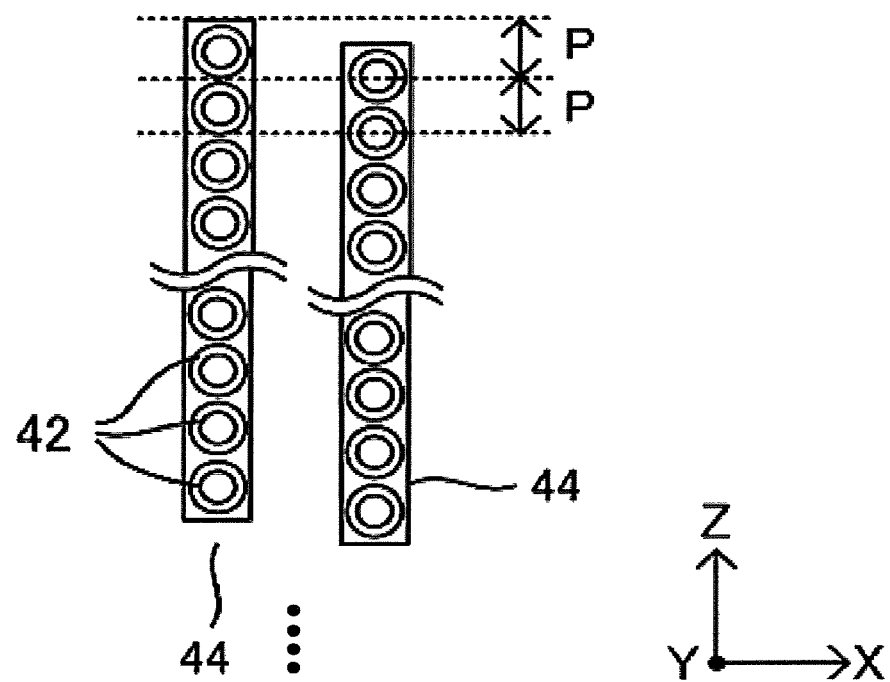
FIG. 5D is a view illustrating another example of an alignment state of array heads.

Moreover, the array heads 44 may be arranged with slightly sifting in the main-scanning direction (Z-axis direction), as illustrated in FIG. 5D. High resolution can be realized by arranging the array heads as illustrated in FIG. 5D.

EXAMPLES

Examples of the present disclosure will be described hereinafter, but Examples shall not be construed as limiting the present disclosure.

Production Example 1

Production of Thermosensitive Recording Material
(1) Preparation of Dye Dispersion Liquid (A Liquid)
The following composition was dispersed by a sand mill to prepare a dye dispersion liquid (A Liquid).

| | |
|---|---|
| 2-anilino-3-methyl-6-dibutylaminofluoran | 20 parts by mass |
| 10% by mass polyvinyl alcohol aqueous solution | 20 parts by mass |
| Water | 60 parts by mass |

(2) Preparation of B Liquid
The following composition was dispersed by means of a ball mill to prepare B Liquid.

| | |
|---|---|
| 4-hydroxy-4'-isopropoxydiphenylsulfone | 20 parts by mass |
| 10% by mass polyvinyl alcohol aqueous solution | 20 parts by mass |
| Water | 60 parts by mass |

(3) Preparation of C Liquid
The following composition was dispersed by means of a ball mill to prepare C Liquid.

| | |
|---|---|
| Photothermal conversion material (indium tin oxide (ITO)) | 20 parts by mass |
| Polyvinyl alcohol aqueous solution (solid content: 10% by mass) | 20 parts by mass |
| Water | 60 parts by mass |

(4) Preparation of Thermosensitive Coloring Layer Coating Liquid
The following composition was mixed to prepare a thermosensitive coloring layer coating liquid.

| | |
|---|---|
| A Liquid above | 20 parts by mass |
| B Liquid above | 40 parts by mass |
| C Liquid above | 2 parts by mass |
| Polyvinyl alcohol aqueous solution (solid content: 10% by mass) | 30 parts by mass |
| Dioctyl sulfosuccinic acid aqueous solution (solid content: 5% by mass) | 1 part by mass |

Next, wood-free paper having a basis weight of 60 g/m$^2$ was used as a support. Onto the wood-free paper, the thermosensitive coloring layer coating liquid was applied in a manner that a dry deposition amount of the dye contained in the thermosensitive coloring layer coating liquid was to be 0.5 g/m$^2$, followed by drying to thereby form a thermosensitive coloring layer. As described above, a thermosensitive recording medium as a recording target was produced.

Examples 1 to 3 and Comparative Examples 1 to 3

A solid image was recorded on the produced recording target by means of the recording device illustrated in FIGS. 1 to 3, with setting a relative moving speed with the recording target to 2 m/sec.

The recording device illustrated in FIGS. 1 to 3 had, as emitting units, 100 fiber coupling LDs having the maximum output of 30 W. As an optical fiber array, 100 optical fibers (diameter of each optical fiber: 125 μm, diameter of core: 105 μm) were aligned along the main-scanning direction, and a pitch X of the adjacent optical fibers was 130 Incident energy was 5 W.

In Examples 1 to 3 and Comparative Examples 1 to 3, an image meant an area formed by surrounding an area in which a density was 50% of density difference between the maximum recording density and an unrecorded area when the image was measured by a microdensitometer (PDM-7, available from available from KONICA MINOLTA, INC.).

In Examples 1 to 3 and Comparative Examples 1 to 3, a solid image was recorded by adjusting conditions, such as laser power, in a manner that a ratio (A'D/A'C) and L1/L2 presented in Table 1 were obtained. In FIGS. 6A to 11A, schematic views illustrating overlapped states of spot writing units next to each other of Examples 1 to 3 and Comparative Examples 1 to 3 are presented. In FIGS. 6B to 11B, schematic views illustrating overlapped state of writing units next to each other of Examples 1 to 3 and Comparative Examples 1 to 3 in the main-scanning direction are presented. In FIGS. 6C to 11C, schematic views for explaining a definition of an oval of the writing unit of Examples 1 to 3 and Comparative Examples 1 to 3 are presented.

Next, density unevenness of the obtained solid images were evaluated in the following manner. The results are presented in Table 1.

<Evaluation of Density Unevenness of Solid Image>

The obtained solid image was observed with naked eyes and observed with a scale loupe (scale loupe available from PEAK, 10×), and density unevenness was evaluated based on the following criteria.

Excellent: No density unevenness was observed with naked eyes and the loupe.
Good: No density unevenness was observed with naked eyes and there was no problem in practical use.
Poor: Density unevenness due to burns of an image etc. was observed with naked eyes and it was not suitable for practical use.

TABLE 1

Figure 6A:
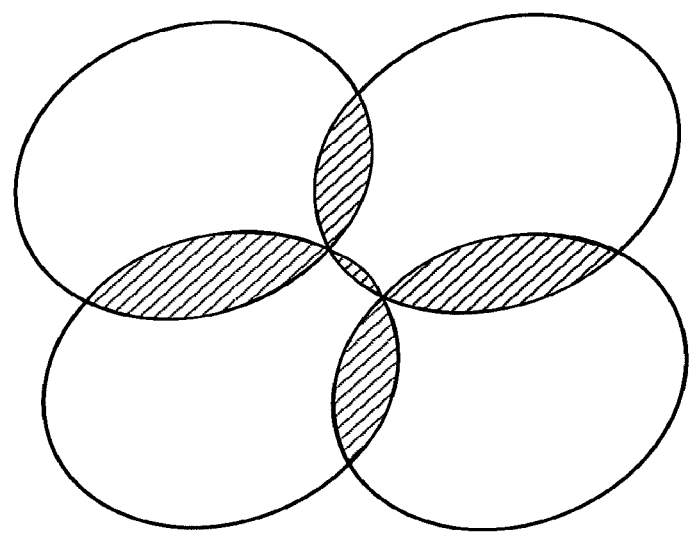
FIG. 6A is a schematic view illustrating an overlapped state of spot image units of Example 1.
Figure 6B:
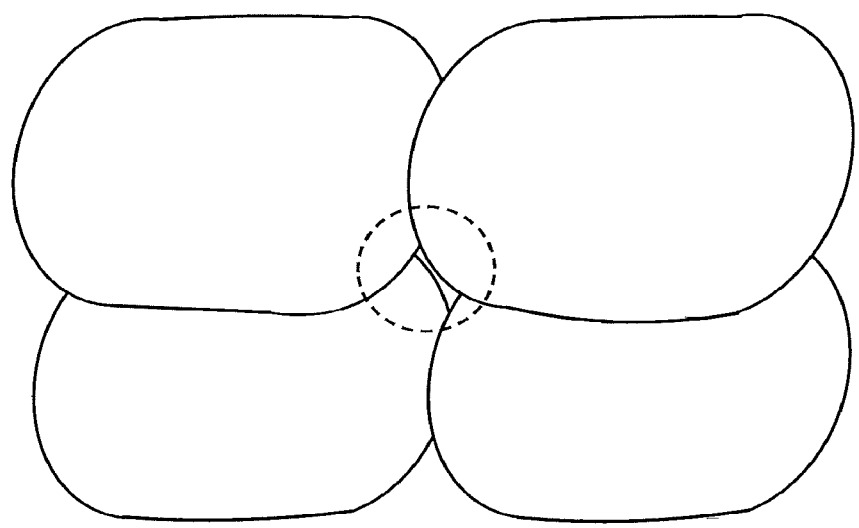
FIG. 6B is a schematic view illustrating an overlapped state of writing units of Example 1.
Figure 6C:
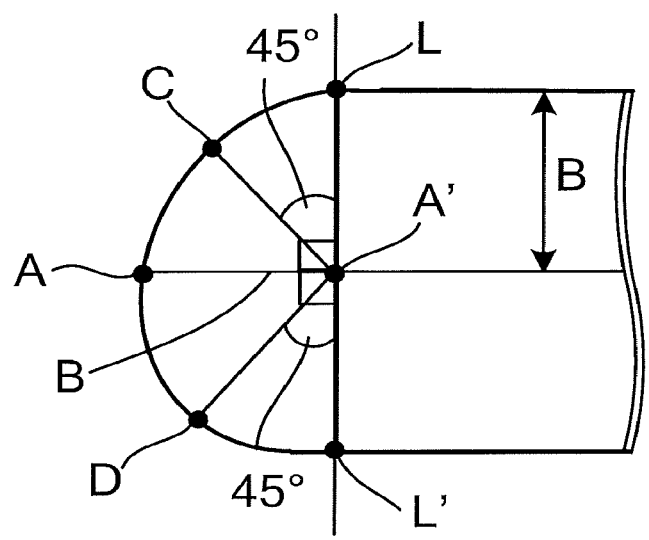
FIG. 6C is a view for explaining a definition of an oval of the writing unit of Example 1.
Figure 7A:
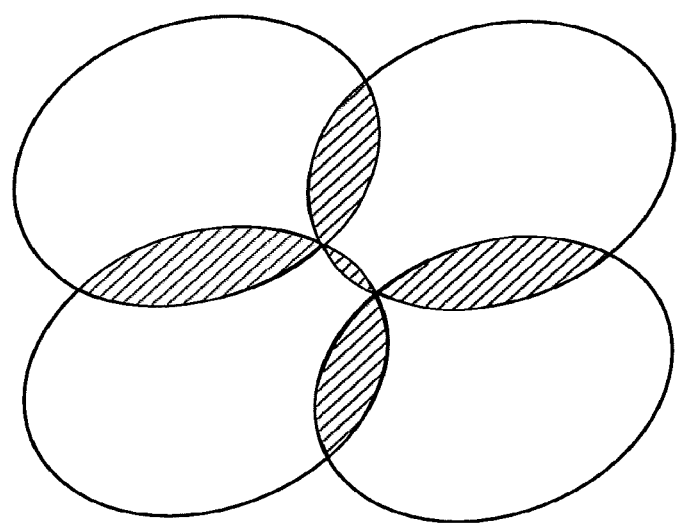
FIG. 7A is a schematic view illustrating an overlapped state of spot image units of Example 2.
Figure 7B:
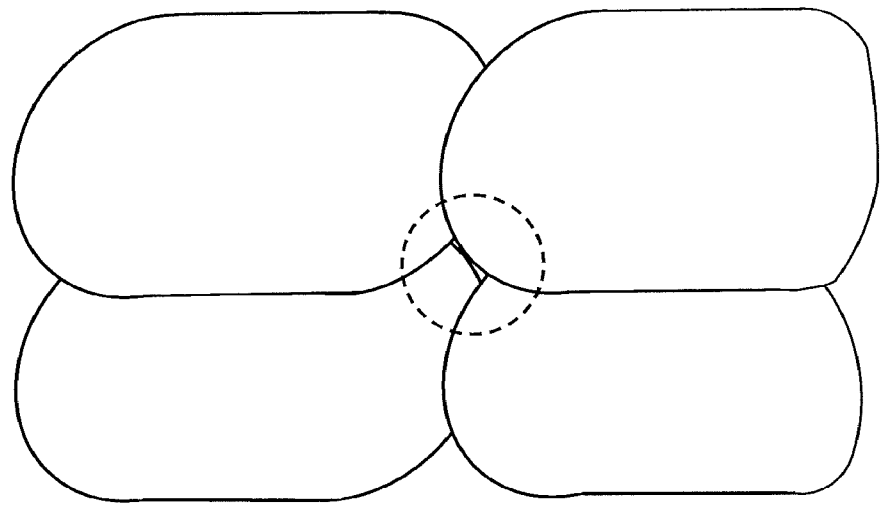
FIG. 7B is a schematic view illustrating an overlapped state of writing units of Example 2.
Figure 7C:
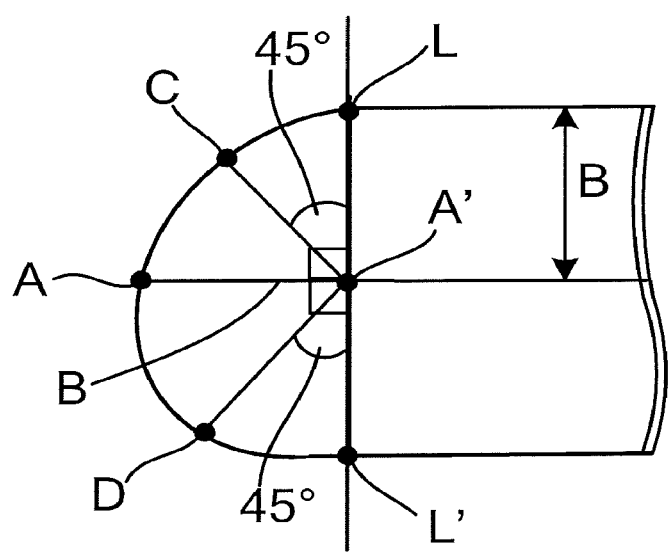
FIG. 7C is a view for explaining a definition of an oval of the writing unit of Example 2.
Figure 8A:
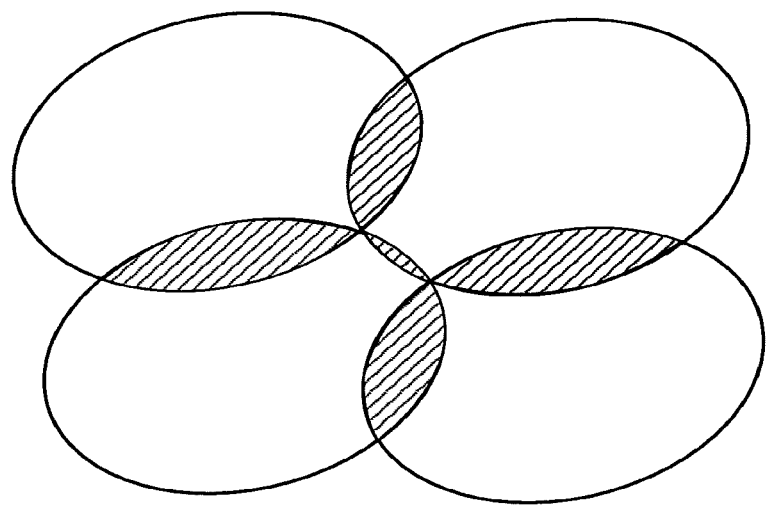
FIG. 8A is a schematic view illustrating an overlapped state of spot image units of Example 3.
Figure 8B:
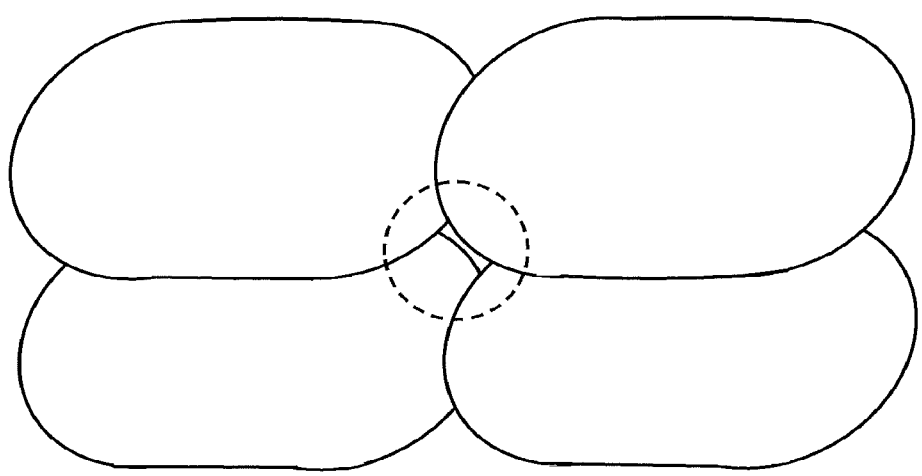
FIG. 8B is a schematic view illustrating an overlapped state of writing units of Example 3.
Figure 8C:
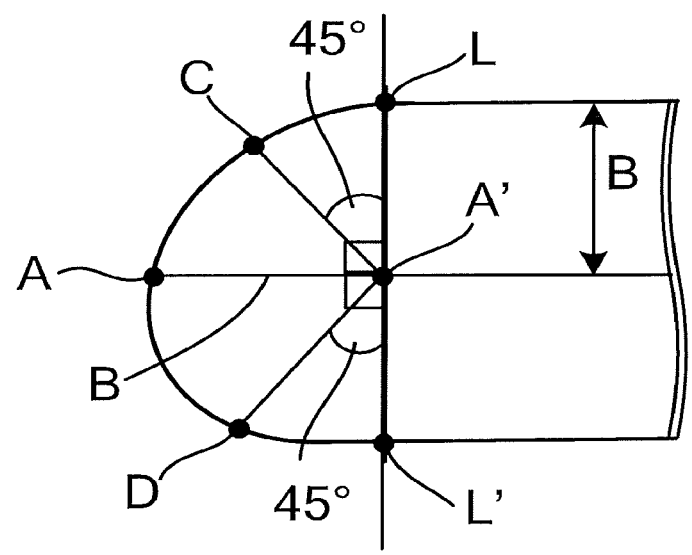
FIG. 8C is a view for explaining a definition of an oval of the writing unit of Example 3.
Figure 9A:
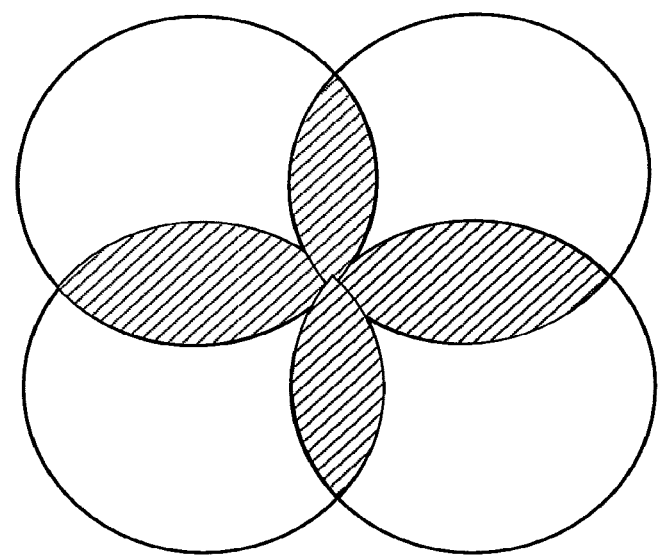
FIG. 9A is a schematic view illustrating an overlapped state of spot image units of Comparative Example 1.
Figure 9B:
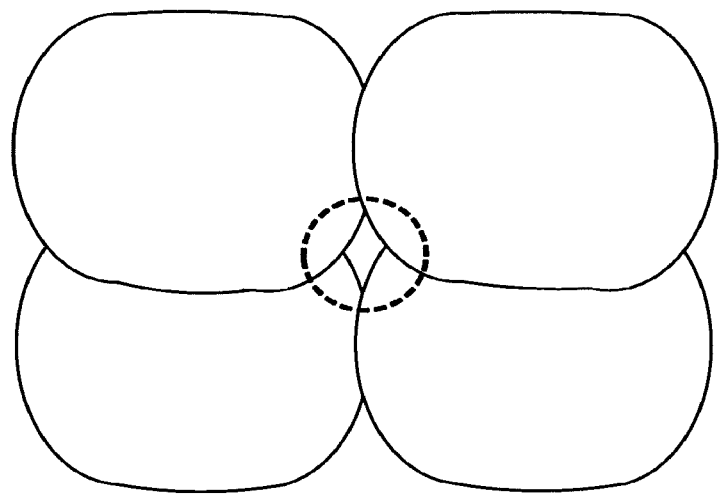
FIG. 9B is a schematic view illustrating an overlapped state of writing units of Comparative Example 1.
Figure 9C:
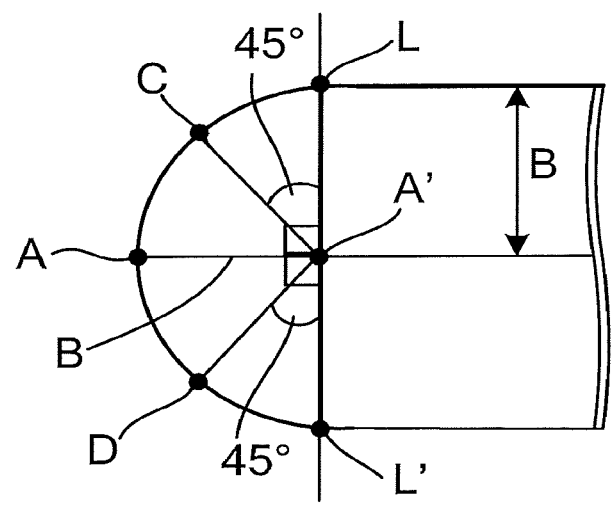
FIG. 9C is a view for explaining a definition of an oval of the writing unit of Comparative Example 1.
Figure 10A:
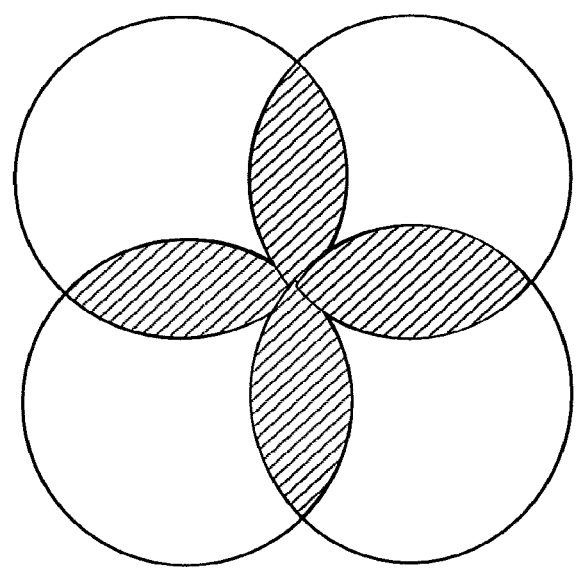
FIG. 10A is a schematic view illustrating an overlapped state of spot image units of Comparative Example 2.
Figure 10B:
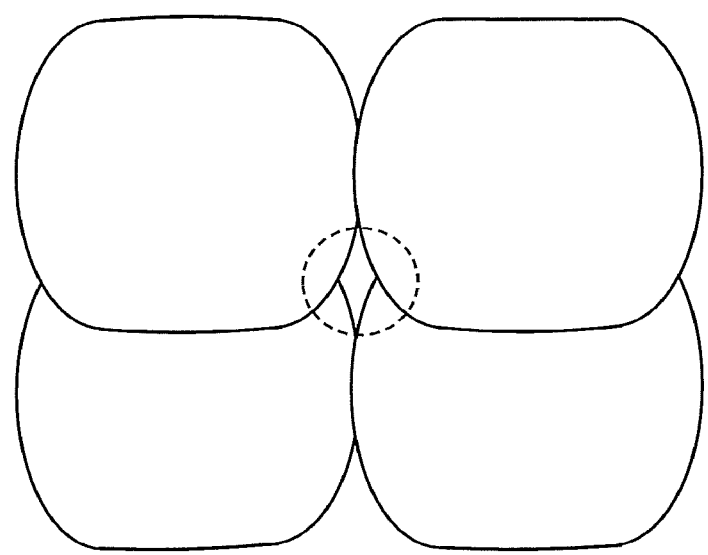
FIG. 10B is a schematic view illustrating an overlapped state of writing units of Comparative Example 2.
Figure 10C:
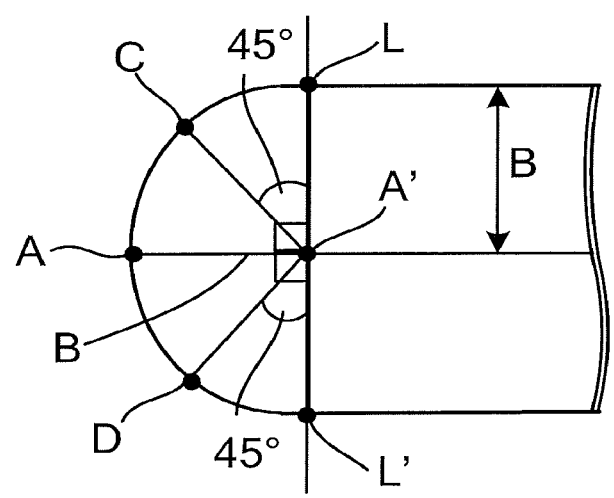
FIG. 10C is a view for explaining a definition of an oval of the writing unit of Comparative Example 2.
Figure 11A:
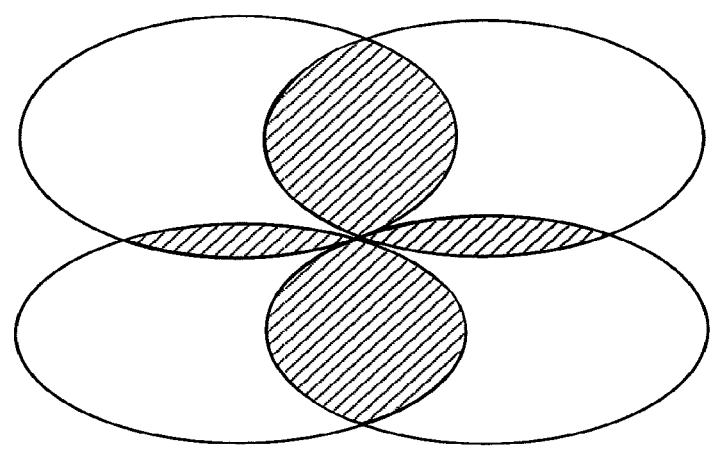
FIG. 11A is a schematic view illustrating an overlapped state of spot image units of Comparative Example 3.
Figure 11B:
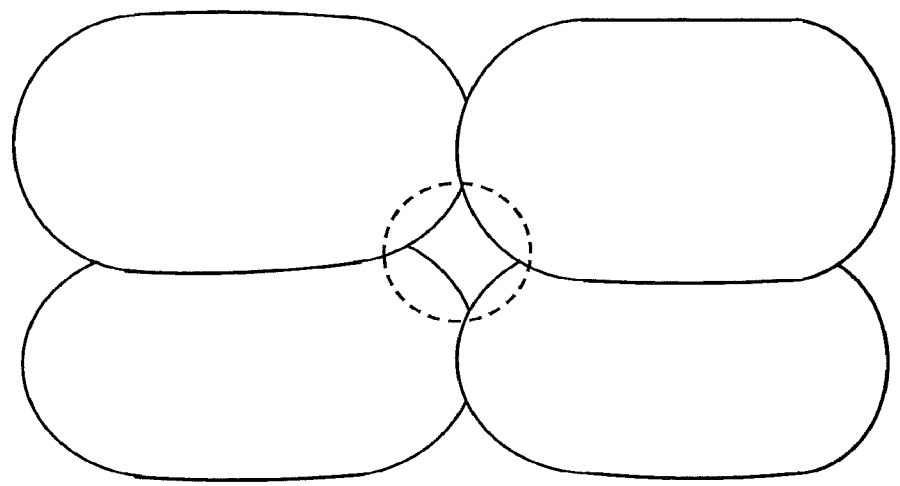
FIG. 11B is a schematic view illustrating an overlapped state of writing units of Comparative Example 3.
Figure 11C:
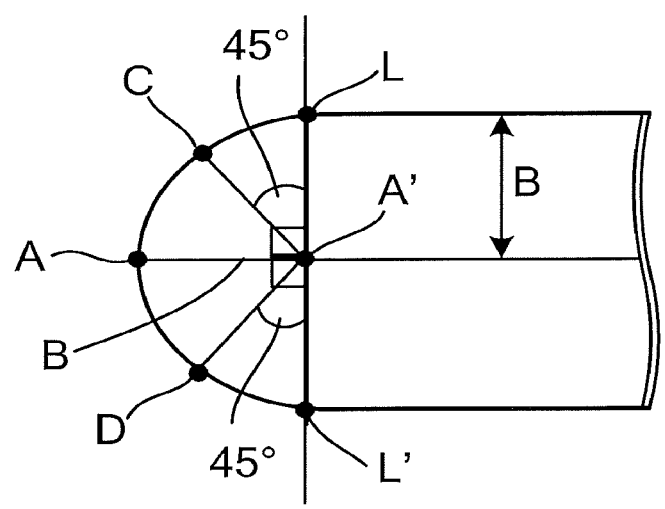
FIG. 11C is a view for explaining a definition of an oval of the writing unit of Comparative Example 3.

| | Ratio (A'D/A'C) | L1/L2 | Density unevenness of solid image | FIGs. |
|---|---|---|---|---|
| Ex. 1 | 1.20 | 1.2 | Good | FIGS. 6A to 6C |
| Ex. 2 | 1.21 | 1.2 | Excellent | FIGS. 7A to 7C |
| Ex. 3 | 1.33 | 1.2 | Good | FIGS. 8A to 8C |
| Comp. Ex. 1 | 1.0 | 1.0 | Poor | FIGS. 9A to 9C |
| Comp. Ex. 2 | 1.0 | 1.2 | Poor | FIGS. 10A to 10C |
| Comp. Ex. 3 | 1.0 | 1.2 | Poor | FIGS. 11A to 11C |

For example, embodiments of the present disclosure are as follows.

<1> A recording method including:
emitting laser light from an optical fiber array to record an image with moving a recording target and the optical fiber array relatively using a recording device, where the image is formed of writing units and the recording device includes a plurality of laser light-emitting elements and an emitting unit that includes the optical fiber array, in which a plurality of optical fibers configured to guide laser light emitted from the laser light-emitting elements are aligned,
wherein (A'D/A'C) that is a ratio of a length of a diagonal line A'D to a length of a diagonal line A'C in the image formed in a manner that at least part of the writing units are overlapped one another in a main-scanning direction is 1.05 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

<2> The recording method according to <1>,
wherein (A'D/A'C) that is the ratio of the length of the diagonal line A'D to the length of the diagonal line A'C is 1.10 or greater.

<3> The recording method according to <1> or <2>,
wherein a minimum distance between centers of the optical fibers is 1.0 mm or less.

<4> The recording method according to any one of <1> to <3>,
wherein the number of the optical fibers aligned in the optical fiber array is 10 or greater.

<5> The recording method according to any one of <1> to <4>,
wherein the recording target is a thermosensitive recording medium, or a structure including a thermosensitive recording area, or both.

<6> The recording method according to any one of <1> to <5>,
wherein the emitting laser light to the recording target to record an image is performed, while the recording target is conveyed by a recording target-conveying unit that is configured to convey the recording target.

<7> A recording device including:
a plurality of laser light-emitting elements; and
an emitting unit including an optical fiber array, in which a plurality of optical fibers configured to guide laser light emitted from the laser light-emitting elements are aligned,
wherein the recording device is configured to apply laser light emitted from the optical fiber array with moving a recording target and the optical fiber array relatively, to record an image formed of writing units, and wherein (A'D/A'C) that is a ratio of a length of a diagonal line A'D to a length of a diagonal line A'C in the image formed in a manner that at least part of the writing units are overlapped one another in a main-scanning direction is 1.05 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

<8> The recording device according to <7>,
wherein (A'D/A'C) that is the ratio of the length of the diagonal line A'D to the length of the diagonal line A'C is 1.10 or greater.

<9> The recording device according to <7> or <8>,
wherein a minimum distance between centers of the optical fibers is 1.0 mm or less.

<10> The recording device according to any one of <7> to <9>,
wherein the number of the optical fibers aligned in the optical fiber array is 10 or greater.

<11> The recording device according to any one of <7> to <10>,
wherein the recording target is a thermosensitive recording medium, or a structure including a thermosensitive recording area, or both.

<12> The recording device according to any one of <7> to <11>,
further comprising a recording target-conveying unit configured to convey the recording target,
wherein laser light is applied to the recording target to record an image while conveying the recording target by the recording target-conveying unit.

The recording method according to any one of <1> to <6> and the recording device according to any one of <7> to <12> can solve the above-mentioned various problems existing in the art and can achieve the object of the present disclosure.

What is claimed is:
1. A recording method comprising:
emitting laser light from an optical fiber array to record an image with moving a recording target and the optical fiber array relatively using a recording device, where the image is formed of writing units and the recording device includes a plurality of laser light-emitting elements and an emitting unit that includes the optical fiber array, in which a plurality of optical fibers configured to guide laser light emitted from the laser light-emitting elements are aligned,
wherein (A'D/A'C) that is a ratio of a length of a diagonal line A'D to a length of a diagonal line A'C in the image formed in a manner that at least part of the writing units are overlapped one another in a main-scanning direction is 1.05 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

2. The recording method according to claim 1,
wherein (A'D/A'C) that is the ratio of the length of the diagonal line A'D to the length of the diagonal line A'C is 1.10 or greater.

3. The recording method according to claim 1,
wherein a minimum distance between centers of the optical fibers is 1.0 mm or less.

4. The recording method according to claim 1,
wherein the number of the optical fibers aligned in the optical fiber array is 10 or greater.

5. The recording method according to claim 1,
wherein the recording target is a thermosensitive recording medium, or a structure including a thermosensitive recording area, or both.

6. The recording method according to claim 1,
wherein the emitting laser light to the recording target to record an image is performed, while the recording target is conveyed by a recording target-conveying unit that is configured to convey the recording target.

7. A recording device comprising:
a plurality of laser light-emitting elements; and
an emitting unit including an optical fiber array, in which a plurality of optical fibers configured to guide laser light emitted from the laser light-emitting elements are aligned,
wherein the recording device is configured to apply laser light emitted from the optical fiber array with moving a recording target and the optical fiber array relatively, to record an image formed of writing units, and wherein (A'D/A'C) that is a ratio of a length of a diagonal line A'D to a length of a diagonal line A'C in the image formed in a manner that at least part of the writing units are overlapped one another in a main-scanning direction is 1.05 or greater, where B is a length of ½ of a line width of the writing unit in the main-scanning direction, A is a center point of an edge of the writing unit in a sub-scanning direction, A' is a position proceeded inside the writing unit from A by B, a line LL' is drawn to include A' and to be orthogonal to the writing unit, the length of the diagonal line A'C is a length between a line having A' as a starting point and having an angle of 45° with the line LL' and a cross point C of the line with the writing unit, and the length of the diagonal line A'D is a length between a line having A' as a starting point and having an angle of 135° with the line LL' and a cross point D of the line with the writing unit.

8. The recording device according to claim 7,
wherein (A'D/A'C) that is the ratio of the length of the diagonal line A'D to the length of the diagonal line A'C is 1.10 or greater.

9. The recording device according to claim 7,
wherein a minimum distance between centers of the optical fibers is 1.0 mm or less.

10. The recording device according to claim 7,
wherein the number of the optical fibers aligned in the optical fiber array is 10 or greater.

11. The recording device according to claim 7,
wherein the recording target is a thermosensitive recording medium, or a structure including a thermosensitive recording area, or both.

12. The recording device according to claim 7,
further comprising a recording target-conveying unit configured to convey the recording target,
wherein laser light is applied to the recording target to record an image while conveying the recording target by the recording target-conveying unit.

* * * * *